F. BEE.
CHURN.
APPLICATION FILED JUNE 13, 1918.
1,301,536. Patented Apr. 22, 1919.
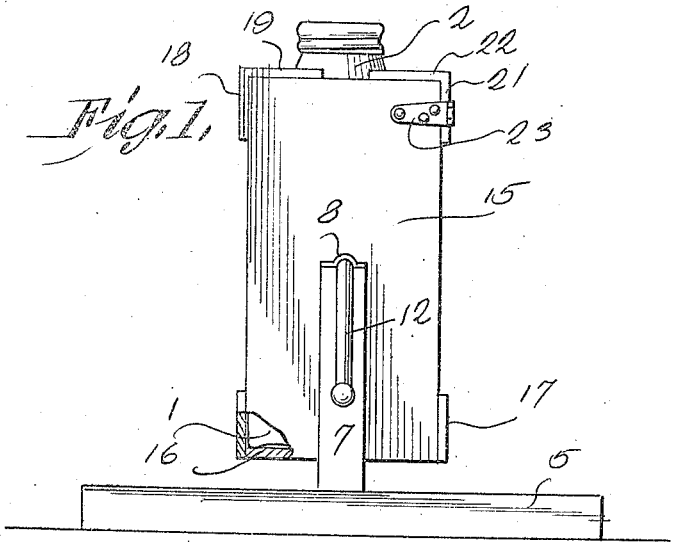
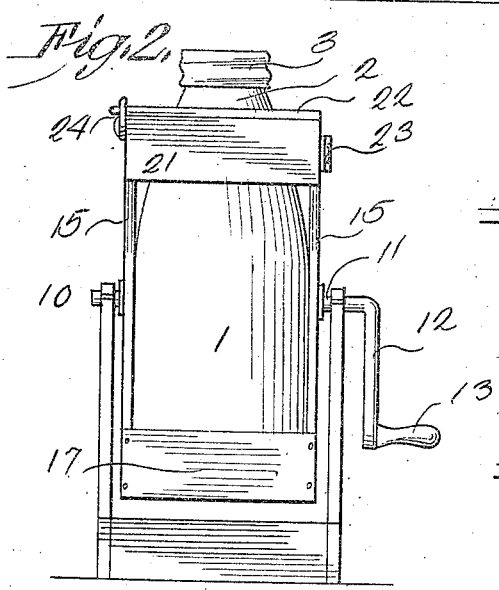
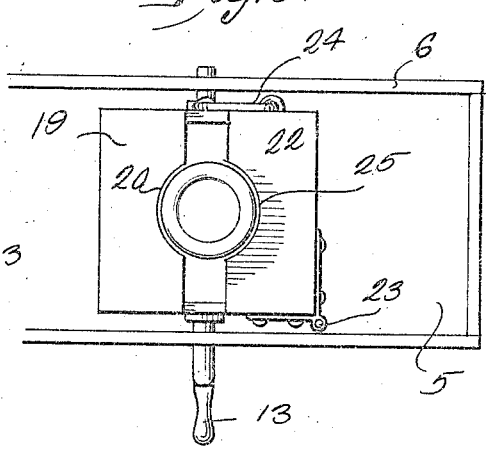
INVENTOR
Frank Bee,
WITNESSES
BY
ATTORNEY

UNITED STATES PATENT OFFICE.

FRANK BEE, OF VELPEN, INDIANA.

CHURN.

1,301,536. Specification of Letters Patent. Patented Apr. 22, 1919.

Application filed June 13, 1918. Serial No. 239,797.

*To all whom it may concern:*

Be it known that I, FRANK BEE, a citizen of the United States, residing at Velpen, in the county of Pike and State of Indiana, have invented certain new and useful Improvements in Churns, of which the following is a specification.

This invention relates to churns, and more especially to those having a working body; and the object of the same is to utilize an ordinary Mason fruit jar for churning small quantities of butter, beating eggs, and mixing other things in the household.

A further object is to produce an extremely simple framework for supporting the jar, with the idea that it may be sold to the housekeeper and she herself can supply the jar.

A yet further object is to conserve the sanitary properties of all parts by rendering them easy of cleaning.

Finally I would make the structure cheap and simple so as to put it within the reach of all.

Details are set forth in the following specification, and reference is made to the drawings wherein:—

Figure 1 is a front elevation and
Fig. 2 a side elevation while
Fig. 3 is a plan view of this device complete.

In the drawings the numeral 1 designates the body and 2 the neck of an ordinary Mason fruit jar such as are in every-day household use, and 3 the metal cap or closure thereof which is ordinarily screwed on and off as the housekeeper will understand. I propose to use one of these fruit jars as the body of my churn or mixer, and it is quite possible that the remaining elements may be made in sizes so that a pint jar or a quart jar may be applied thereto, the same being either sold in connection with the remaining elements or left for the purchaser herself to supply.

The base of this device is indicated at 5, being by preference a flat tray with an upstanding marginal edge 6. Rising from its sides are standards 7 notched at their upper ends to produce bearings and these notches perhaps overlaid with strap metal as indicated at 8. Mounted in said bearings at one side is a trunnion 10 and at the other side a shaft 11 having a crank 12 with a handle 13. The trunnion and the shaft at their inner ends are secured to the mid-length of boards 15 forming the front and rear of a box-like structure which incloses the fruit jar. At their lower ends these boards are connected by a bottom 16 on which the jar rests, and their edges are connected by cleats 17 which hold the lower end of the jar in place. At the upper end of the boards they are connected at one side by a cleat 18 and a top section 19 having a notch 20 of a size to closely embrace the neck 2 of the fruit jar. The corresponding elements 21 and 22 at the other side of the boards 15 are hinged at one end as seen at 23 and provided at their other end with a hook-and-eye connection or latch 24, the inner edge of the top 22 being notched as at 25 so as to engage the other side of the neck of the fruit jar when this element is swung into place as seen in Fig. 3. The parts of the structure other than the jar may be of wood, with the exception of the hardware, and perhaps the bearings 8 may be lined with metal to give them longer life.

In the use of this device, the latch is disconnected, that is the hook is disengaged from the eye, and the movable element or gate 21 swung aside on its hinge 23; then the jar 1 is inserted as seen in Fig. 2 and the movable element closed and latched. Now the user fills the jar with the material to be agitated and applies the cap or closure 3. Now she grasps the handle 13 and rotates the entire churn body, its trunnions turning in the bearings 8, and the contents of the jar being thoroughly agitated. It may be wise to remark that the jar should not be filled completely full, thereby leaving space within it into which the contents rushes from one position in the jar to another each time the jar is turned over in the rotation of the churn body, which I would prefer should be deliberate rather than rapid. The fact that the jar 1 is made of glass gives the user the chance to look into the same and see how the work of churning or agitating progresses. When it is completed, the rotation is stopped, the gate unlatched and turned aside, the entire jar removed, its cap 3 taken off, and the contents poured out. It is quite obvious that all parts can be cleaned very readily and that there is little mechanism and little likelihood of this arrangement necessitating repair.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:—

A churn comprising a box-like structure having a bottom, a pair of cleats fixed across two opposite edges of the same, upright side boards rising from the remaining edges of the bottom, a fixed cleat and fixed top section rigidly connecting the upper portions of said side boards, the top section having a notch at its inner edge, a second cleat and second top section fixed to it and having a complementary notch, a hinge connecting one end of this cleat with one side board, and a latch mechanism connecting the other end of this cleat with the other side board; whereby a fruit jar may be removably seated on said bottom between said side boards and cleats and with its neck engaged by said notches, and means for supporting the structure and revolving it.

In testimony whereof I affix my signature in presence of two witnesses.

FRANK BEE.

Witnesses:
 OSCAR STINSON,
 J. LUTHER ROBINSON.

Copies of this patent may be obtained for five cents each, by addressing the "Commissioner of Patents, Washington, D. C."